United States Patent [19]

Komarek et al.

[11] Patent Number: 5,466,211
[45] Date of Patent: Nov. 14, 1995

[54] METHOD AND APPARATUS FOR MANUFACTURING ARTICLES EMPLOYING FOLDED HONEYCOMB PANELS

[75] Inventors: Dale W. Komarek, Arlington Heights, Ill.; Paul Moser, Milford, Conn.

[73] Assignee: Hexacomb Corporation, Lincolnshire, Ill.

[21] Appl. No.: 12,148

[22] Filed: Jan. 28, 1993

Related U.S. Application Data

[63] Continuation-in-part of Ser. No. 840,768, Feb. 24, 1992, abandoned.

[51] Int. Cl.⁶ .................................. B31D 5/04; B31F 1/10
[52] U.S. Cl. ........................ 493/355; 156/257; 493/354; 493/399; 493/402; 493/403
[58] Field of Search ..................... 493/354, 355, 493/403, 396, 402, 331, 334, 335, 394, 344, 345, 347, 382, 399; 83/862, 863, 864, 865, 880, 886; 428/116; 156/306.6, 313, 257

[56] References Cited

U.S. PATENT DOCUMENTS 2,574,181  11/1951  Hess ...................................... 493/347
3,314,339  4/1967   Guffy .................................... 493/403
3,481,813  12/1969  Wiggards ............................... 493/354
3,785,908  1/1974   Wagers ................................... 493/344
4,596,541  6/1986   Ward, Sr. ............................... 493/354
4,883,179  11/1989  Dionne ................................... 206/523
5,175,041  12/1992  Webb et al. ............................. 428/116

*Primary Examiner*—Jack W. Lavinder
*Attorney, Agent, or Firm*—Olson & Hierl, Ltd.

[57] ABSTRACT

A method is disclosed of folding a honeycomb panel, the panel preferably comprising a honeycomb core having opposing face sheets. A slit is preferably cut through one face sheet and the underlying honeycomb core and a wedge is driven into the honeycomb panel at the location of the slit. The wedge crushes the honeycomb core to a preselected depth with a preselected angle whereby the crushed honeycomb core forms a hinge. The honeycomb panel can then folded along the hinge in a direction opposite the intact face sheet. Adhesives can be used to hold the hinge in the folded position.

16 Claims, 5 Drawing Sheets

METHOD AND APPARATUS FOR MANUFACTURING ARTICLES EMPLOYING FOLDED HONEYCOMB PANELS

RELATED APPLICATION

This application is a continuation-in-part of Ser. No. 840,768, filed Feb. 24, 1992 now abandoned.

TECHNICAL FIELD

This invention relates to a method and apparatus for manufacturing articles from honeycomb material and, in particular, articles having folded honeycomb panels.

BACKGROUND OF THE INVENTION

Honeycomb panels have been employed for many years because of its great strength and durability combined with light weight. Generally, honeycomb panels comprise a series of abutting hexagonal cells. The walls of the cells are typically a kraft paper, sometimes resin-impregnated for water resistance. Of course, other materials such as plastic films can also be employed if desired. As will be appreciated, the width of the cells, the height of the cells or the material can all be varied to impart desired characteristics to the honeycomb material.

Typically, face sheets cover the open ends of the cells. Such face sheets are also generally kraft paper though other materials such as plastic films, aluminum foil and the like have been employed.

It is often desirable to fold the honeycomb panel. For example, inserting three ninety degree bends which quarter a honeycomb panel will form the walls of a square box. By varying the location and number of such folds, other polygonally-shaped boxes may be produced. Further, intersecting folds combined with complete cuts of honeycomb panels can yield various corner and edge protectors.

The corners and edges of any product are the most likely to come into unwanted contact with other objects. Such contact can result in damage such as scratches, dents, chipped paint and the like. If severe enough, such damage can result in an unsalable product and resulting loss. Even minor damage results in a loss of aesthetics and often results in lowered prices.

As a consequence, many edge and corner protector products are available to manufacturers and shippers to guard against such losses. Some competitive products are manufactured of expanded foam, corrugated paper or even composite materials such as a corrugated corner protector with one or more honeycomb panels glued to it to provide additional protection. However, many edge and corner protector products use honeycomb panels to take advantage of its properties.

Specifically, honeycomb provides thicker protective material with higher strength while using less paper than a comparable corrugated panel. Further, paper honeycomb is a recyclable product as opposed to expanded foam.

To use honeycomb panels for edge and corner protection, the honeycomb panels must fold properly. There are three methods currently in use today to fold honeycomb panels, pressure scoring, slit scoring and V-cut scoring.

The pressure score is formed by pressing a cylinder into the honeycomb panel. The cylinder forms an arced depression in the panel which does not cut either of the two face sheets. If pressure scored from both sides, the resulting double-scored honeycomb panel section will act as a two-way hinge.

However, such a pressure-scored honeycomb panel often does not fold predictably along the chosen line. In addition, the effort required to bend the honeycomb panel into the desired angle toward the depression is high. It should be understood that a high folding effort may be undesirable in some applications.

Lastly, two such pressure scores cannot be situated in proximity to each other on the same side of the panel without special arrangements. Each pressure score competes for the face sheet which results in tearing of the face sheet if two pressure scores are proximate to one another. To overcome this obstacle, special spring movable wedge pairs have been employed that allow the proximate wedges to move towards each other to relieve the face sheet stress. However, the resulting scored panel will actually be shorter than the unscored panel by the distance so moved.

Another common method of folding honeycomb panels is a slit score. A knife or razor simply slits the honeycomb panel completely through one face sheet and the honeycomb core, leaving only the second face sheet intact to act as the hinge. The panel is then folded away from the slit. This method is quick, accurate and results in a very low folding effort. The slit score lends itself to long-length slitting for edge protection or interior reinforcement of long packages. In addition, die-cut slit scoring can produce elaborately configured corner protectors.

However, the slit score does not protect well in direct corner impacts. Only the second face sheet covers an exposed edge or corner and thus the corner impact strength is low. In addition, the exposed honeycomb core often detracts from package aesthetics.

The last method is the V-cut score. A V-shaped trough is sawn completely through one face sheet and the honeycomb core. The vertex of the "V" is just above the second face sheet. By folding the "V" cut closed, the honeycomb panel will form a clean looking corner having an angle dependent upon the angle of the V-cut.

However, this method is limited by the complexity of the equipment needed to saw a number of V-shaped troughs in parallel. In addition, such cuts cannot be performed via a die-cut process, so products with intersecting fold lines such as corner protectors have not been produced using this method.

What is needed is a process for producing folds in a honeycomb panel which has the ease and simplicity of slit scoring yet produces the aesthetics of V-cut scoring. The method should also be usable in a die cut process as well as a continuous process so that polygonal containers, edge protectors and corner protectors are easily manufactured. The resultant honeycomb panel should fold predictably and should have a low folding effort with good corner impact strength. Once folded, the panel should preferably remain folded.

The present invention meets these desires.

SUMMARY OF THE INVENTION

The present invention is a method for preparing a honeycomb panel for folding along a predetermined line and the honeycomb panel produced by such a method. The honeycomb panel preferably has a honeycomb core and opposing face sheets. A knife or similar tool having a cutting edge is used to slit the panel along the predetermined line. The slit extends one face sheet and preferably at least partially through the core. The second face sheet is not slit.

A wedge having a vertex is then driven into the honeycomb panel along the predetermined line to crush the honeycomb panel to a predetermined depth and angle. This crushed portion forms a hinge in the panel and the panel can then be folded along this hinge., The wedge crushes the honeycomb core which creates a hinge at that location. The honeycomb panel is then folded along the hinge in a direction opposite the intact face sheet. An adhesive means such as glue or tape can be applied to at least a part of the crushed portion to hold the angle of the hinge if desired. The angle made by the hinge is controlled by the preselected wedge angle and the depth in which the wedge penetrates the honeycomb panel.

BRIEF DESCRIPTION OF THE DRAWING

In the accompanying drawings, which form a portion of this disclosure.

DESCRIPTION OF THE PREFERRED EMBODIMENT

This invention relates to an apparatus for constructing articles out of honeycomb panels and the resulting articles which are so constructed. Honeycomb panels are made of honeycomb core and preferably also include face sheets on opposing sides of the core. The reason such honeycomb panels are valuable for various packing operations is that they not only provide strength and protection, but do so with a relatively lightweight structure.

The present invention allows the honeycomb panel to be folded along a predetermined line. To prepare the honeycomb panel for folding, the present invention partially slits the honeycomb panel along the predetermined line. A wedge having a vertex is driven into the honeycomb panel along the predetermined line to crush the honeycomb panel to a predetermined depth and at a predetermined angle. The slit can be put in the honeycomb panel before or at the same time that the wedge is driven into the honeycomb panel. The crushed portion of the honeycomb panel can then be formed into a hinge and the honeycomb panel folded along the hinge. An adhesive means such as glue or tape can be applied to a part of the crushed portion to hold the angle of the hinge.

Figure 1:
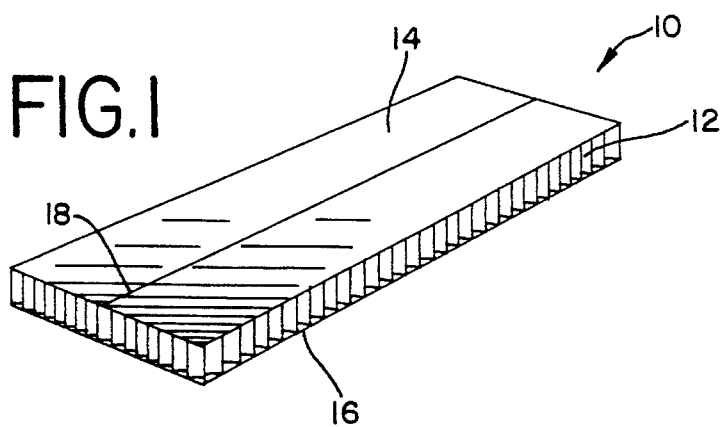
FIG. 1 is a perspective view of a honeycomb panel having a slit.

Referring now to FIG. 1, a honeycomb panel 10 having a honeycomb core 12 sandwiched between a first face sheet 14 and a second face sheet 16 is shown. Preferably, the honeycomb core 12 and the face sheets 14 and 16 are made of a kraft paper. In one method, a slit 18 is partially cut by a knife having a cutting edge (not shown) along a predetermined line into the honeycomb panel 10. The slit 18 cuts at least the first sheet 14 but leaves the second face sheet 14 intact. Alternatively, the slit can be a line of perforations instead of the continuous slit 18 as shown. The honeycomb core 12 can be fully intact, partially intact or completely severed as desired.

Figure 2:
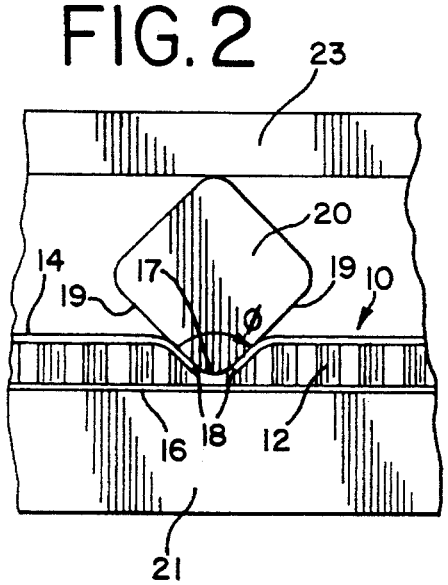
FIG. 2 is an end view showing one alternate method of practicing the present invention.

As shown now in FIG. 2, a wedge 20 having vertex 17 is driven into the honeycomb panel 10 along the slit 18 to a predetermined depth, the wedge 20 extending to but not through the second face sheet 16. The wedge 20 includes two sidewalls 19. The vertex 17 can be either a rounded radius corner as shown in FIG. 2 or a sharp point as shown below in FIGS. 7A, 7B or 9A.

The alternate embodiment illustrated in FIG. 2 is performed on a flat press (not fully shown). The honeycomb panel 10 is positioned on the bed 21 of the flat press. The wedge 20 is positioned either manually or by mounting as shown. The press face 23 of the flat press descends and forces the wedge 20 into the honeycomb panel 10. Because the wedge is driven to a predetermined depth only such pressure as is needed is used. As can be understood, the pressure needed varies with the length of the wedge, the thickness and resiliency of the panel and depth and angle chosen.

The purpose of the slit 18 is to relieve stress in the first face sheet 14 when the wedge 20 is driven into the honeycomb panel 10. Failure to cut the slit 18 can result in unpredictable tearing or folding of the first face sheet 14. The vertex 17 of the wedge 20 is preferably a rounded corner having a radius of less than one-half the thickness of the honeycomb panel 10.

Figure 3:
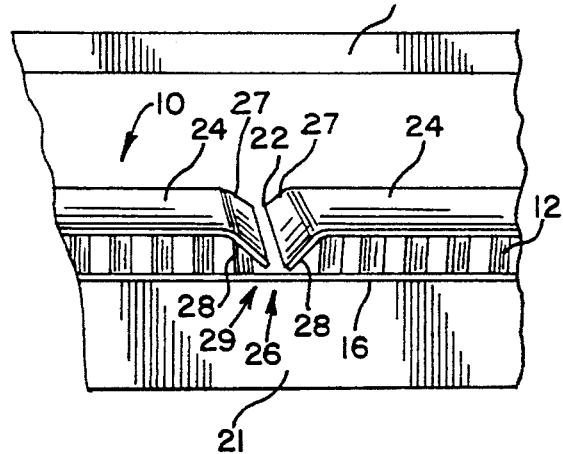
FIG. 3 is an end view showing the honeycomb panel with an angle crush slit score.

As shown in FIG. 3, driving the wedge 20 into the honeycomb panel 10 as described creates a V-shaped trough 22 by crushing the honeycomb core 12 in its path. Thus the honeycomb panel 10 is separated into two panels 24 which are joined by the intact second face sheet 16. The intact second face sheet 16 acts as a hinge 26 about which the opposing separate panels 24 may rotate. The two separate panels 24 also have two crushed portions 28 which form respective halves and thus define the V-shaped trough 22. The entire V-shaped trough 22, the crushed portions 28 and the hinge 26 form the components of an angle crush slit score 29.

Figure 4:
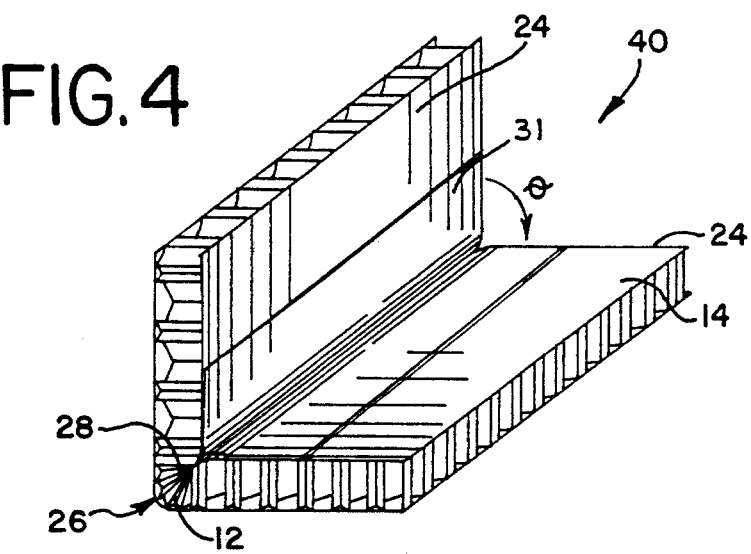
FIG. 4 is a perspective view showing the honeycomb panel folded along the angle crush slit score.

As shown in FIG. 4, by rotating the opposing separate panels 24 about the hinge 26 in the direction of the first face sheet, the two crushed portions 28 are brought together. Once the two crushed portions 28 meet, the honeycomb core 12 underlying the crushed portions 28 prevents further movement without a great deal of folding effort.

To hold the panels in a folded position, an adhesive means is used. In one embodiment, the adhesive means 27 can be positioned on at least a part of that portion of the first face sheet 14 covering the two crushed portions 28. The adhesive means 27 can be a double-sided tape or an application of an adhesive such as glue. The panels are then folded and the adhesive means 27 maintains the panels in a folded position.

As an alternate embodiment, the hinge 26 can be first closed as shown in FIG. 4 and a single-sided tape 31 applied as the adhesive means to both opposing first face sheets 14 of the two separate panels 24. Because the tape 31 is on the face sheets 14 and does not extend into crushed portions 28, it maintains the panels in the folded position as shown in FIG. 4.

An example of folded panels is shown in FIG. 4. The angle which is formed by the two separate panels 24 when rotated to this point is determined by the angle $\phi$ of the wedge 20. In this particular embodiment, the knife and the wedge 20 are used in two separate operations. In that case, the angle $\phi$ of the wedge 20 is approximately equal to or slightly greater than the angle $\Theta$ formed by the two separate panels 24. Any difference in the angles $\phi$ and $\Theta$ is caused by the resiliency of the honeycomb core 12 which can result in a slight bounce back effect after the wedge 20 is withdrawn. Thus where $\Theta$ is 90 degrees $\phi$ is preferably about 90 to about 100 degrees.

Figure 5:
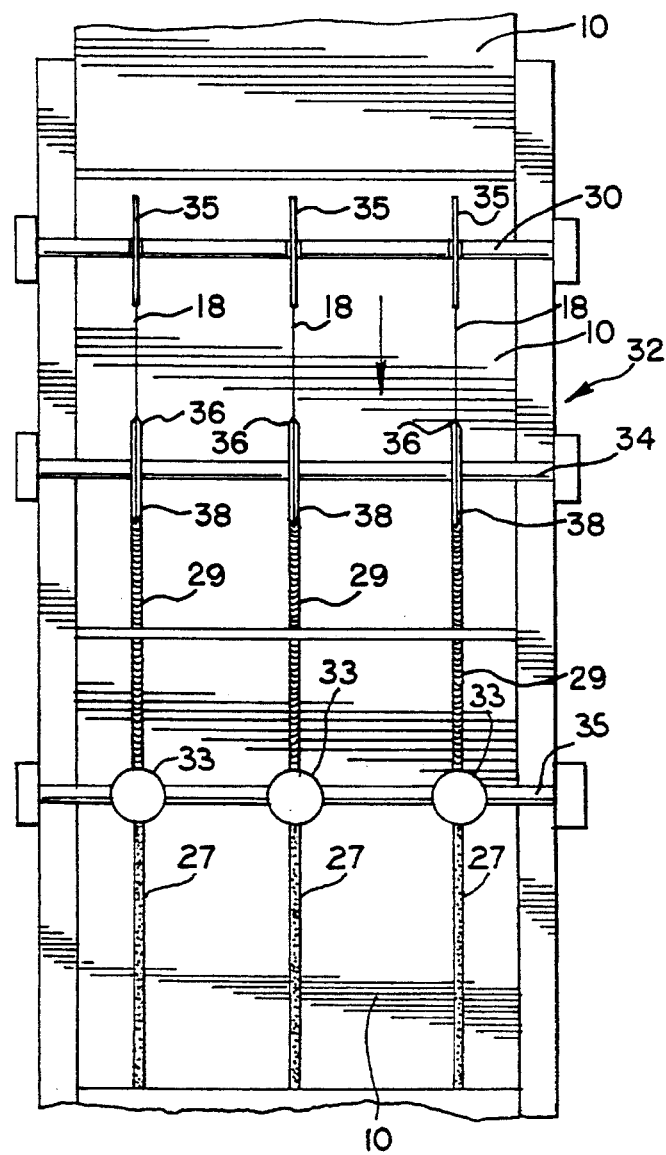
FIG. 5 is a top view of a continuous method of practicing the present invention.

In a preferred embodiment best seen in FIG. 5, the slit 18 is made in a first station 30 of a continuous machine while the crushing operation is performed at a second station 34. In this embodiment, wedge 45 and vertex 44 are incorporated onto the circumference of a wheel 36 to produce a tool 38 suitable for a continuous operation.

The honeycomb panels 10 (three are shown) are fed into the first station 30 on a suitable support 32 where the slits 18 are made using any suitable industrial circular knives 35. As shown, circular knives 35 have smooth cutting edges, but serrated cutting edges can also be used. Knife technology is well-known in the art and need not be further described.

The slit honeycomb panels 10 are fed into the second station 34 where the wheels 36 are positioned on the support 32 to match the location of the slits 18. The wedged wheels 36 crush the honeycomb panel 10 along the slits 18 as described previously. The slit and crushed honeycomb panel 10 are shown as being cut to the desired length prior to this operation, though this cutting could also be performed subsequent to the slitting and crushing operation if desired.

Use of the support 32 to provide a continuous machine process is preferred for manufacturing linear parallel angle crush slit scores 29 such as needed for edge protectors or extended length packaging. By bisecting a long honeycomb panel 10 with the angle crush slit score line 29 and folding it as described above and as shown in FIG. 4, an edge protector 40 is formed. The edge protector 40 does not have exposed honeycomb core 12 along its length, thus maintaining aesthetic concerns, and it also has substantial corner impact strength.

It is often desirable to manufacture a panel with the desired angle set. In one embodiment, after the second station 34 a third station 35 is added where adhesive means 27 is applied to the angle crush slit scores 29 by an applicator 33. The adhesive means 27 is preferably a water-based recyclable glue such as polyvinyl acetate. The glue can be applied in any number of methods such as extrusion, printing or spray. Use of such a glue is a benefit in recycling the panels after use.

Perhaps the easiest glue to apply is a hot melt glue. However, such glues are sometimes not preferred due to the difficulty in recycling such materials.

As an alternative embodiment, double-sided tape such as splicing tape could be applied as the adhesive means 27 to the angle crush slit scores 29. The tape could even be applied before the angle crush slit score 29 except that a release liner would need to cover the top surface until after the angle crush slit score 29 was made. The release liner would be stripped just prior to folding to the desired shape.

Still another embodiment employs an adhesive transfer tape as the adhesive means 27. The adhesive transfer tape consists of an adhesive and a release liner. The entire adhesive transfer tape is applied to the desired location, and then the release liner is stripped away, leaving only the adhesive behind. The adhesive transfer tape combines the ease of use of a tape with the end user recyclability of a glue.

Figure 6A:
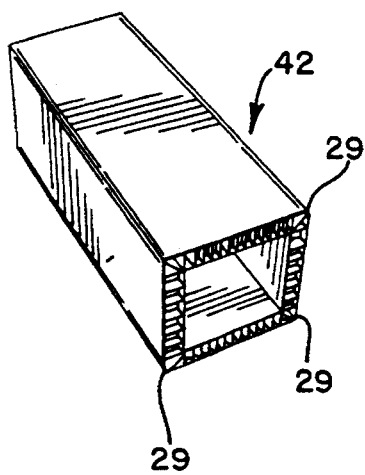
FIG. 6A is a perspective view of an extended length package made using the present invention.

The glued products are folded into the desired shape and held until the glue is set. At this point, products such as illustrated in FIGS. 4 and 6A are completed. If tape is used, such fold and hold procedure may not be needed with certain tapes. Others, such as the adhesive transfer tape may still require the fold and hold procedure.

In another embodiment, the panels without adhesive means 27 could be folded first. After being folded, single-sided tape 31 is applied to the inside of the folded corner to hold the desired shape and angle as seen in FIG. 4.

The FIG. 4 single-sided tape 31 can be chosen to provide additional features. For example, a kraft paper packaging tape could be utilized to provide a high friction, non-slip surface if desirable to prevent slippage of the folded panel. Where a slick surface is desired, a coated kraft paper tape having a non-abrasive coating such as Nomar 70™ sold by Michelman, Inc. of Cincinnati, Ohio, USA can be used. This particular coating can be glued and is recyclable. Alternately, a slippery surface could be provided by a glossy polyester tape to provide protection against scratches and the like.

Still another variation is to ship the angle crush slit scored panels flat and apply the adhesive means 27 at the end user. Either glue or double-sided tape can be applied into the angle crush slit score 29 at that point. A glue application is less desirable at the end user because of the need to hold in the desired shape until the glue sets. Alternatively, the panels can first be folded and the single-sided tape applied to the inside corner.

A third variation is to ship the angle crush slit scored panels flat but with adhesive means 27 in place. Suitable adhesive means for this process include dry or water-based contact adhesives such as National Adhesive Bondmaster™ adhesives, or a double-sided tape or a glue having a release liner covering the exposed tacky surface.

If, however, the adhesive means 27 is limited to the crushed portions 28 and is not applied to the opposing face sheets 14 of separate panels 24, then even tacky adhesives such as pressure sensitives can be used. The crushed portions 28 are lower than the opposing face sheets 14 of the separate panel 24. Thus, when stacked, the adhesive means 27 would not contact the second face sheet 16. This also allows the panels to be shipped flat and only be folded at the customer.

Figure 6B:
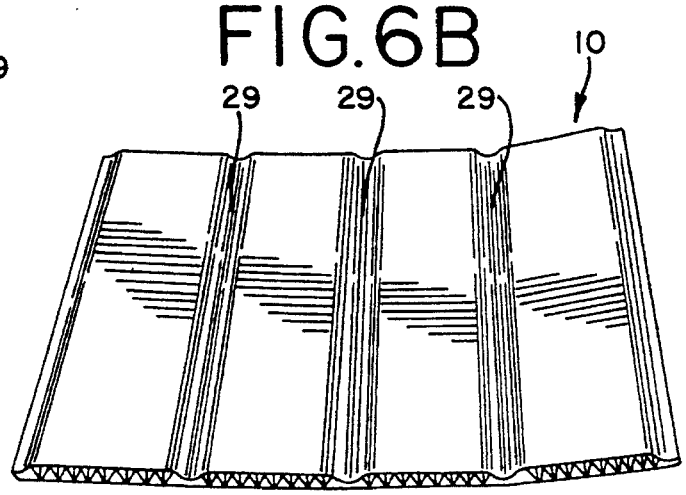
FIG. 6B is a perspective view of the honey-comb panel having three angle crush slit scores which makes up the extended length package shown in FIG. 6A.

As seen in FIGS. 6A and 6B, an extended length package 42 having a square cross-section can be created by quartering a long honeycomb panel 10 with three such angle crush slit scores 29. The square extended length package 42 will have the aesthetics and the corner impact strength as described above. In addition, the substantial increase in the folding effort beyond the selected angle Θ will prevent "parallelograming" of the extended length package 47. Parallelograming occurs when one side of the package 47 is positionally offset from its opposite side, thus resulting in a package having cross-section of a parallelogram instead of the desired square.

Of course, triangular, rectangular, hexagonal or any other suitably shaped extended length packages or other desired packaging forms can be designed by selecting the appropriate number of cuts and the distance between each cut as well as the appropriate angle φ for the wedges.

Figure 7A:
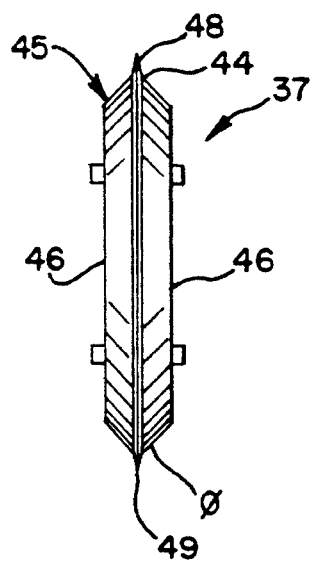
FIG. 7A is a view in the plane of a circular knife and wheel combination used in one embodiment of the present invention.
Figure 7B:
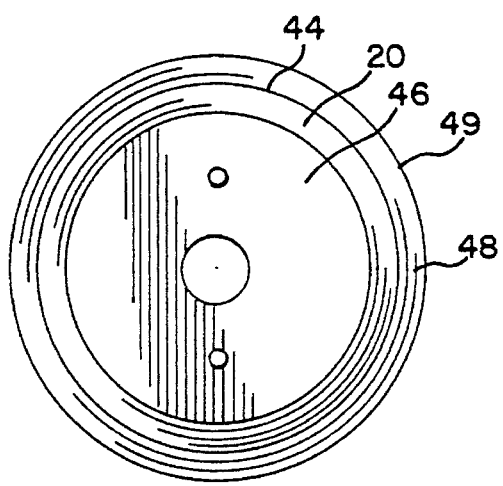
FIG. 7B is a view perpendicular to the plane of the circular knife and wheel combination shown in FIG. 7A.

The aforementioned embodiment can utilize the previously described two-step method for making an angle crush slit score 29. However, such a process can also be made into a one-step method by mounting the knife at the vertex 44 of the wedge 45 thus forming a knifed wheel 37 as best seen in FIGS. 7A and 7B.

The two-step method is preferred for a continuous linear process as it has been found to be easier to maintain then the one-step process. In particular, the one-step process requires that all knife diameters be very closely matched to cut close to but not through the second face sheet 16 to allow wedge penetration. However, in the two-step method, the knife only needs to cut the first face sheet 14 which allows much greater tolerances.

To modify the previously described continuous process to be one-step, the wedge 45 is preferably made from two wedge segments which separate at the vertex 44. In FIGS. 7A and 7B, the wedge segments are two complementary half-wheels 46. A circular knife 48 is concentrically mounted between the half wheels 46. The circular knife 48 will have a radius which is slightly greater than the radius of the wheel 37, preferably about ⅛ inch (0.32 cm) greater. Thus, a cutting edge 49 of the circular knife 48 will extend beyond the vertex 44 of the wedge 45 a predetermined distance and will contact the honeycomb panel 10 first. The cutting edge 49 can be circular, serrated, perforated or any other suitable shapes.

Using the circular knife 48 and wheel 37 combination mounted on a suitable support, the angle crush slit score 29 is made in one step. However, since the wedge 20 will no longer extend into the honeycomb panel 10 a distance equal to that of the knife 48, the angle Θ made by folding the separate panels 24 will be smaller than the angle φ of the wedge. Accordingly the wedge angle φ is preferably about 100 degrees to about 120 degrees and optimally about 110 degrees to result in about a 90° panel angle Θ in the one-step method.

While this wedge and knife can be used in the continuous process described above, it is primarily used in a die-cut process which is employed to manufacture articles which do not utilize parallel angle crush slit scores 29, such as a corner protector 50. A die cut process can also be employed for parallel angle crush slit scores 29 if desired.

Figure 8A:
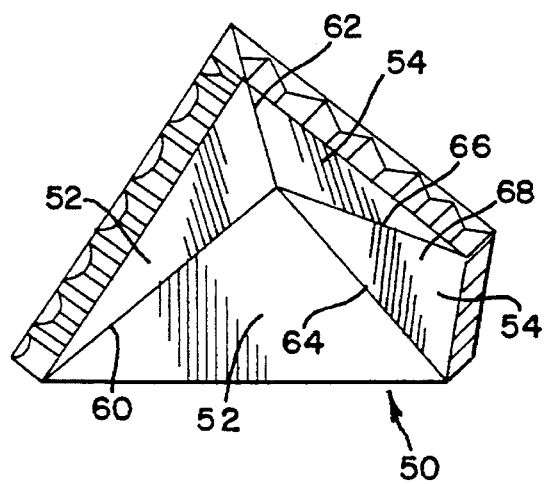
FIG. 8A is a perspective view of a corner protector made using the present invention.
Figure 8B:
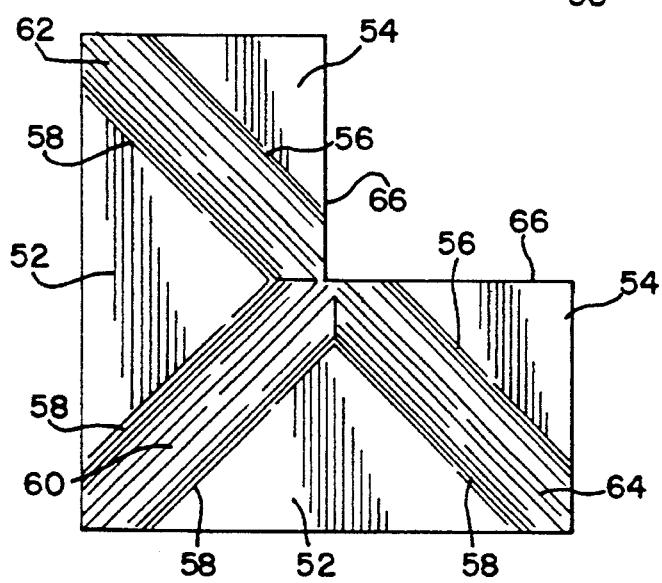
FIG. 8B is a top view showing the honeycomb panel having three angle crush slit scores which makes up the corner protector of FIG. 8A.

A simple type of corner protector 50 is shown in a folded position in FIG. 8A and a flat position in FIG. 8B. The corner protector 50 has four portions of a honeycomb panel 10 which are preferably shaped as right isosceles triangles as best seen in the flat position in FIG. 8B. There are two congruent large triangles 52 and two congruent small triangles 54 where the hypotenuse 56 of the two small triangles 54 is equal in length to the short sides 58 of the two large triangles 52. Stated equivalently, the two small triangles 54 are bisections of the two large triangles 52.

The two large triangles 52 are foldably connected by a first angle crush slit score 60 along two respective short sides, in combination forming a composite right isosceles triangle. The hypotenuses 56 of the two small triangles 54 are foldably connected by a second angle crush slit score 62 and a third angle crush slit score 64 respectively to the remaining short sides 58 of the two large triangles 52.

When each of the angle crush slit scores 60, 62 and 64 is in a folded position, the result is a three sided corner protector 50 as shown in FIG. 8A. The two small triangles 54 are joined along unattached sides 66 by appropriate means to form a composite triangle 68 congruent to the large triangles 52. The appropriate joining means can include glue or tape and the like. The corner protector 50 would be suitable for use with any object having a corner.

As alternative embodiments, two corner protectors 50 may be glued to a strip of corrugated paper for ease of use. If the glue and corrugated paper are applied to the exposed faces of the four small triangles 54, an edge and corner protector of constant length results. In addition, the placement as described can also perform the function of joining the two small triangles 54 together to form composite triangle 68.

The methods described previously for gluing or taping the angle crush slit scores 29 are completely applicable to a die cut operation. Glue can be applied to the crushed portion and the panels folded and held until the glue is set. Alternatively, double-sided tape can be applied to the crushed portions or single-sided tape to the inside corner. These operations can be done in line at the manufacturer or at the end user or any place in between.

A further embodiment includes the placement of four corner protectors 50 at the corner of a sheet of corrugated paper. This embodiment forms a side and corner protector of constant size. Again, strategic use of glue and proper orientation of the corner protectors 50 will allow simultaneous joining of the two small triangles 54. Those skilled in the art will realize that both the edge and corner protector and the side and corner protector could be made entirely from honeycomb panels using the described method.

Figure 10:
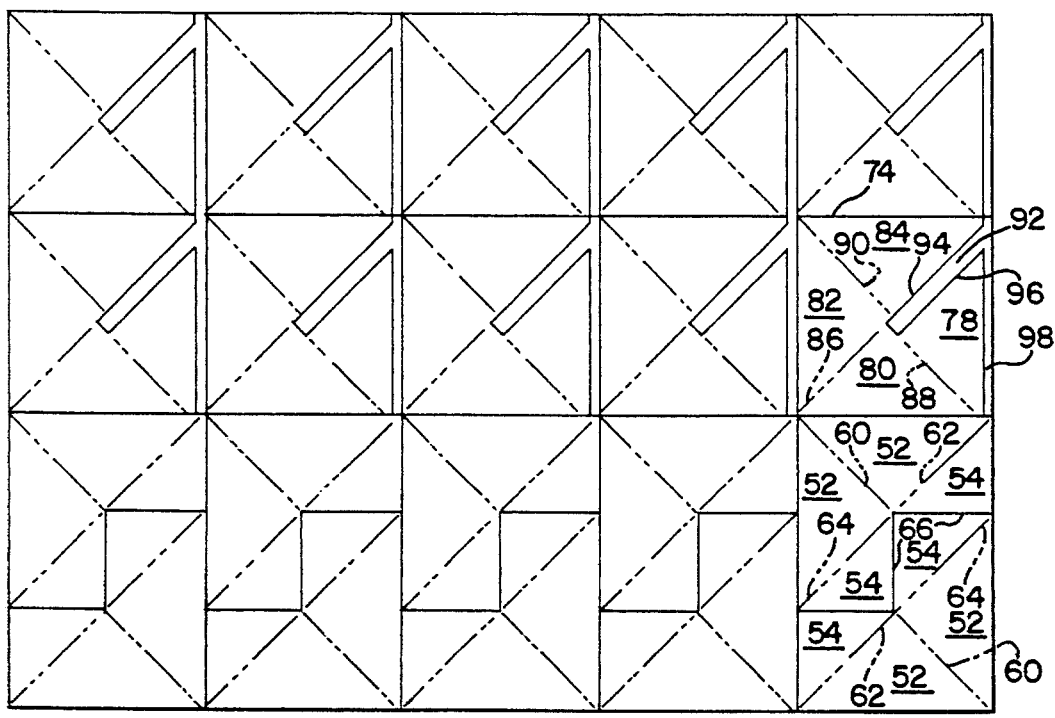
FIG. 10 is a sketch showing the layout of a diecutting tool used to practice one alternate embodiment of the present invention.

Corner protectors 50 can be laid out as shown in the bottom portion of FIG. 10 thus forming a simple rectangle. Such a layout lends itself to a scrap-free die cutting operation to form the individual corner protector 50.

Figure 9A:
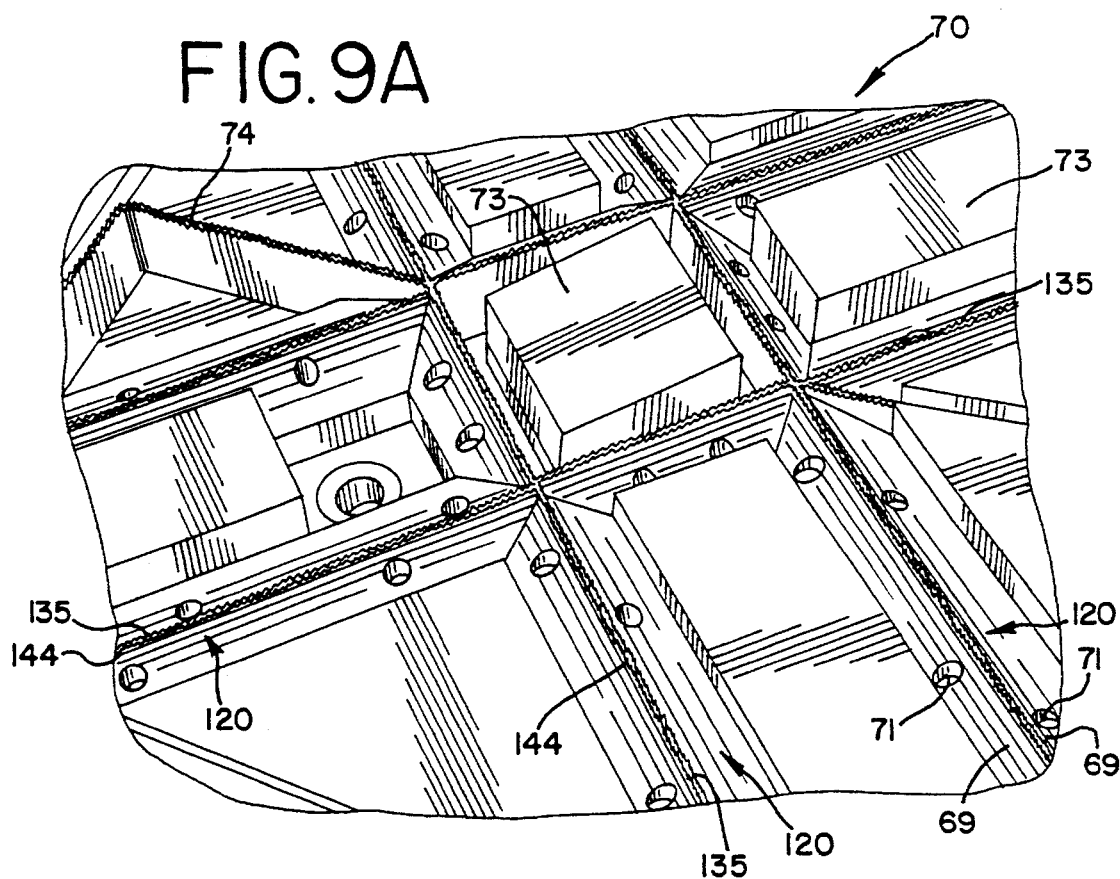
FIG. 9A is a perspective view of a diecutting tool used to practice another embodiment of the present invention.
Figure 9B:
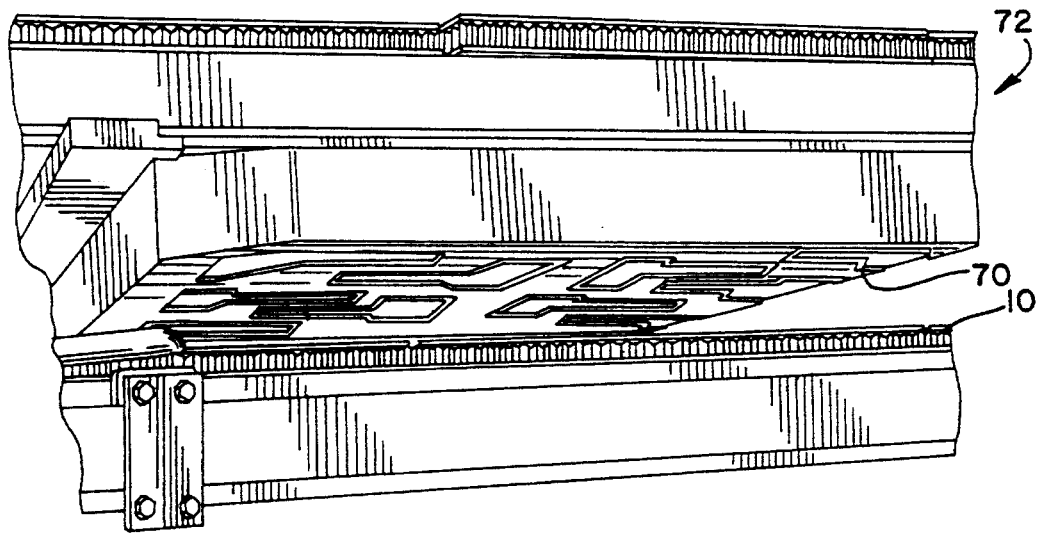
FIG. 9B is a perspective view of a die cut press used to practice another embodiment of the present invention.

All of the angle crush slit scores 29 for the corner protectors 50 are preferably made in one step by a die-cutting tool 70 as shown in FIGS. 9A and 9B. The die-cutting tool 70 consists of a serrated knife 135 which projects slightly above the vertex of the wedge 120 which are mounted on a support. Other knife edges such as perforations, serrations and the like may also be used. In this embodiment, the wedges 120 include two wedge segments which are two half wedges 69.

In one alternate embodiment, the wedges 120 are mounted within the die cutting tool 70 by way of screws (not shown) set in recesses 71 which are cut into the half wedges 69. In addition, cushioning blocks 73 made of an easily compressible material such as a plastic foam are preferably positioned between the knife 135 and wedge 120 combinations to prevent damage to the honeycomb panel. It has been found that the cushioning blocks 73 act to prevent movement of the panel without damage of the honeycomb panel during the actual die-cutting operation.

The die-cutting tool 70 is mounded in a die-cutting press 72. As the die-cutting tool 70 is brought down upon a rectangular honeycomb panel, the knives 135 will cut the slits through the first face sheet and the honeycomb core. The wedges 120 will follow the knives 135 into the slits as described above in connection with the circular knife 48 and wedge 45 combination.

In addition, deep knives 74 which are not mounted with the wedges 120 are set to cut through all the layers of the honeycomb panel 10 including the second face sheet 16 to separate the individual corner protectors 50.

Figure 11:
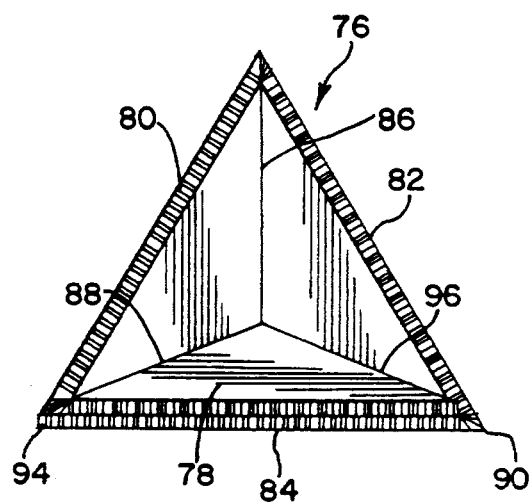
FIG. 11 is a perspective view of a double thickness corner protector made using another embodiment of the present invention.

As can be appreciated by one skilled in the art, far more complex shapes may be die cut as described above. For example, the die layout shown in the upper portion of FIG. 10 results in a double thick corner protector 76 as shown in the folded position in FIG. 11 which is a cut from a square honeycomb panel 10. For ease of reference, the solid lines in FIG. 10 indicate the placement of a deep knife 74 while the broken lines indicate a knife 135 and wedge 120 combination. The upper portion of the die layout of FIG. 10 can also be considered a stylistic representation of the flat position for the double thick corner protector 76.

The double thick corner protector 76 includes a first 78, a second 80, a third 82 and a fourth 84 triangularly shaped portion. Three angle crush slit scores are cut into a rectangle in a roughly T-shaped orientation with a leg 86 and a first arm 88 and a second arm 90 each terminating about at a vertex of the square. However, the first arm 88 of the "T" is oriented parallel to the second arm 90 but is offset in the direction of the leg 86 of the "T" by an amount equal to the thickness of the honeycomb panel.

Further, a first rectangular section 92 is cut out of the square. A first long edge 94 of the first rectangular section 92 extends from the end of the leg 86 of the T. The second long edge 96 of the first rectangular section 92 is parallel to the first long edge 94 but offset by the thickness of the panel in the direction of the first arm 88. Lastly, a second rectangular section 98 is cut from the edge of the square from the end of first rectangular section 92 to the first arm 88. The second rectangular section 98 is also the thickness of the honeycomb panel.

The first arm 88 angle crush slit score is folded first such that the first 78 and second triangles 80 are at right angles to each other. The leg 86 angle crush slit score is the second fold whereby the first 78, second 80 and third 82 triangles are all at right angles to each other.

It will be appreciated that the first rectangular section 92 allows this second fold to occur as the second long edge 96 will now abut the third triangular panel 82. Absent the first rectangular section 92, this second fold could not occur.

The third and last fold is along the second arm 90 angle crush slit score which also could not occur without offsetting the first arm 88 and the second arm 90 as described above. Further, without cutting the second rectangular section 98, the first triangular piece 78 would extend beyond the fourth triangular piece 84. As shown, the double thickness corner protector 76 provides a double thickness where the first 78 and the fourth 84 triangle pieces overlap for extra protection.

Figure 12:
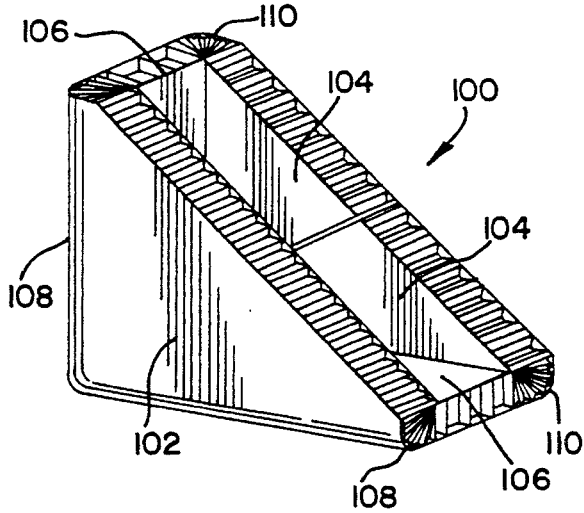
FIG. 12 is a perspective view of a wrap around corner protector made using another embodiment of the present invention.

A wrap around corner piece 100 is shown in the folded position in FIG. 12. The wrap around corner piece 100 essentially has a large triangular portion 102, two congruent smaller triangular portions 104 and two congruent rectangular portions 106. Each triangle 102, 104 is a right isosceles triangle with the hypotenuse of the two small triangles 104 equal in length to the short sides of the large triangle 102. Equivalently, the two small triangles 104 may be described as exactly one-half the area of the large triangle 102.

The two rectangles 106 also have two opposing sides also equal to the length of the short sides of the large triangle 102. The other dimension of the rectangles 106 determines the height of the completed wrap around corner 100.

The large triangle 102 is the center of the wrap around corner 100. Onto each short side, the rectangles 106 are foldably connected via an angle crush slit scores 108 by one of the equal length opposing sides of the rectangles 104. Foldably connected to the other of the equal length opposing sides of the rectangle 106 are the hypotenuses of the smaller triangles 104 by an angle crush slit scores 110.

Once the four angle crush slit scores 108, 110 are folded, the wrap around corner 106 of FIG. 12 is formed. The wrap around corner 100 is suitable for protecting items as, for example, doors, for shipment. Of course, many other shapes are possible for such edge, corner or angle protectors.

The foregoing is illustrative of the principles of the invention. Further, since numerous modifications and changes will readily occur to those skilled in the art, it is not desired to limit the invention to the exact construction and operation shown and described. Accordingly, all suitable modifications and equivalents may be resorted to while still falling within the scope of the invention.

That which is claimed is:

1. A method of folding a honeycomb panel along a predetermined line, the method comprising:

a) partially cutting a slit into the honeycomb panel along the predetermined line;

b) providing a wedge having an angle and a vertex;

c) driving the wedge having the vertex into the honeycomb panel along the predetermined line to crush a portion of the honeycomb panel, the crushed portion of the honeycomb panel forming an angle that is less than the wedge angle and forming a hinge;

d) folding the honeycomb panel along the hinge to a folded position; and e) providing adhesive means to hold the hinge in a folded position.

2. The method of claim 1 wherein the adhesive means is glue applied to at least a part of the crushed portion of the honeycomb panel.

3. The method of claim 2 wherein the glue is a dry contact adhesive.

4. The method of claim 1 wherein the adhesive means is double-sided adhesive tape applied to at least a part of the crushed portion of the honeycomb panel.

5. The method of claim 1 wherein the honeycomb panel comprises a honeycomb core having opposing face sheets, the slit being cut through one face sheet along the predetermined line.

6. The method of claim 1 wherein at least a portion of the honeycomb core is slit along with the one face sheet along the predetermined line.

7. The method of claim 1 wherein the adhesive means is a single-sided adhesive tape applied after folding, the adhesive tape covering the hinge and the slit face sheet abutting the hinge.

8. The method of claim 7 wherein the single-sided tape is a non-slip tape.

9. The method of claim 7 wherein the single-sided tape is a slippery tape.

10. The method of claim 1 wherein the adhesive means is a pressure-sensitive adhesive applied only to the crushed portion of the honeycomb panel.

11. The method of claim 1 wherein the wedge angle is greater than 90 degrees and less than 120 degrees.

12. The method of claim 11 wherein the vertex is a rounded radius corner.

13. The method of claim 11 wherein the vertex is a sharp point.

14. The method of claim 11 wherein the step of cutting is done before the step of driving.

15. The method of claim 11 wherein the steps of cutting and driving are done at substantially the same time.

16. A method of manufacturing a foldable honeycomb panel, the method comprising the steps of:

a) cutting a slit into a honeycomb panel, b) driving a wedge having a vertex into the slit to crush a portion of the honeycomb panel, the crushed portion forming a hinge whereby the honeycomb panel can be folded, wherein an angle of the wedge is greater than 90 degrees and less than 120 degrees; and c) providing an adhesive material on the honeycomb panel to hold the honeycomb panel in a folded position.

* * * * *